Patented Nov. 3, 1942

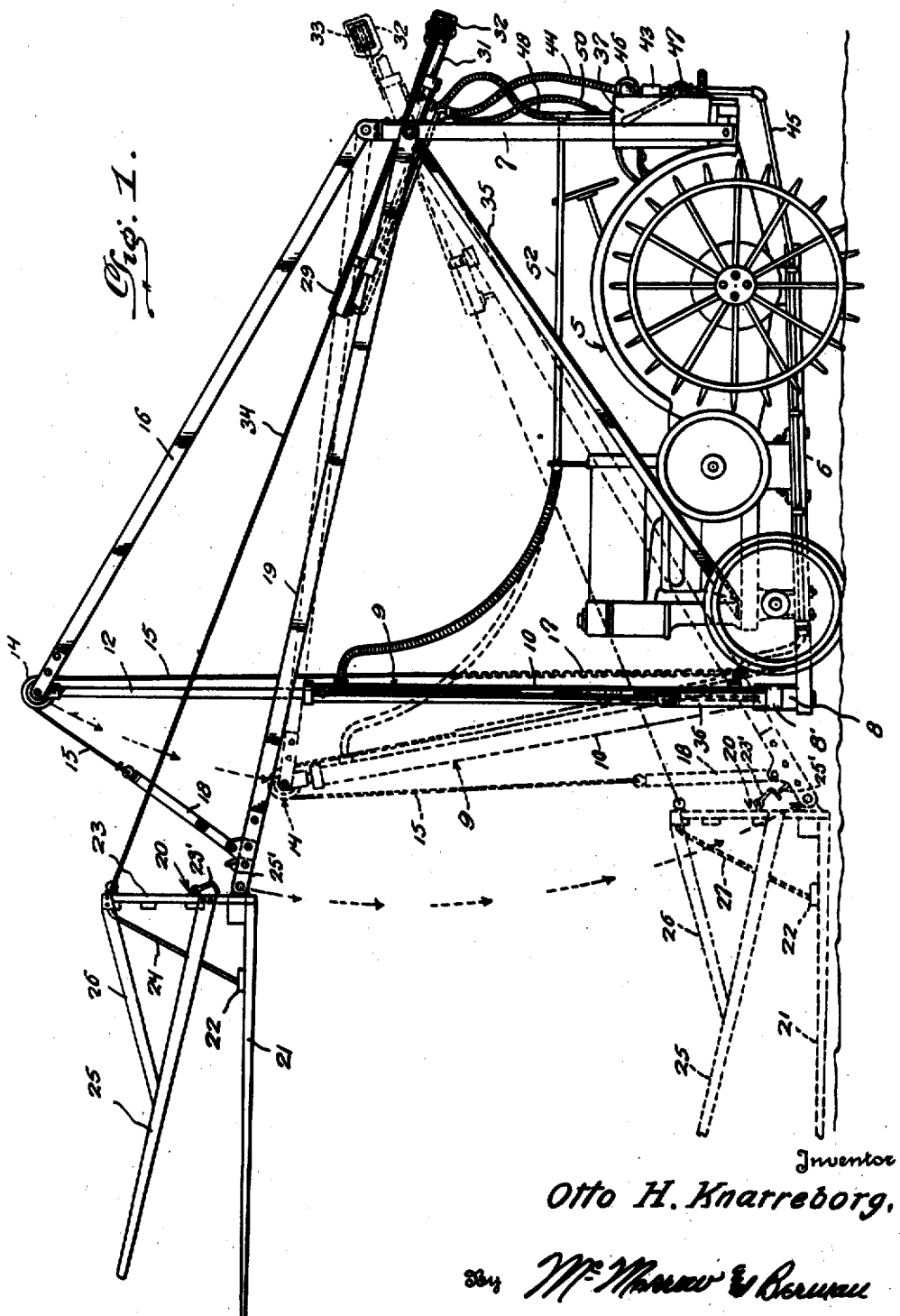

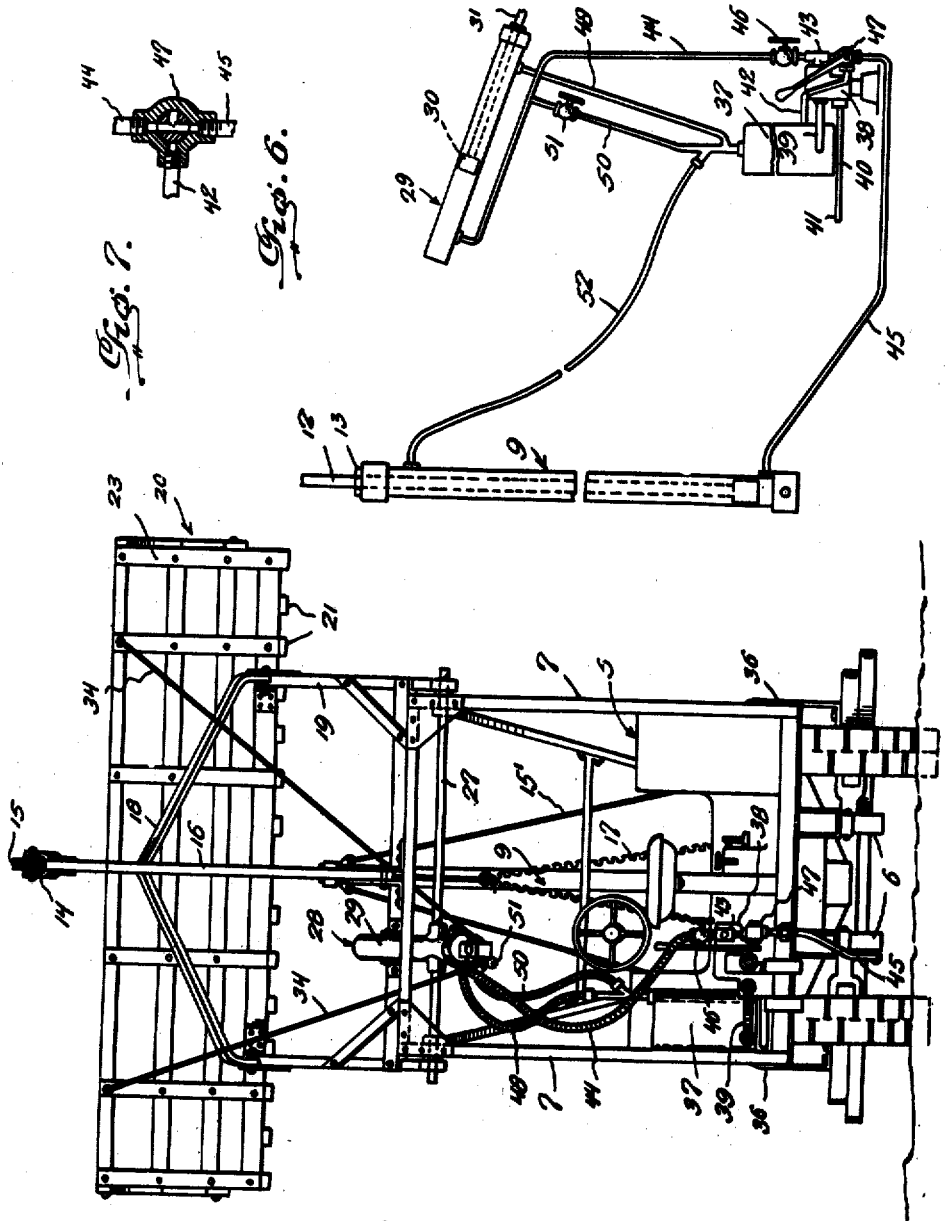

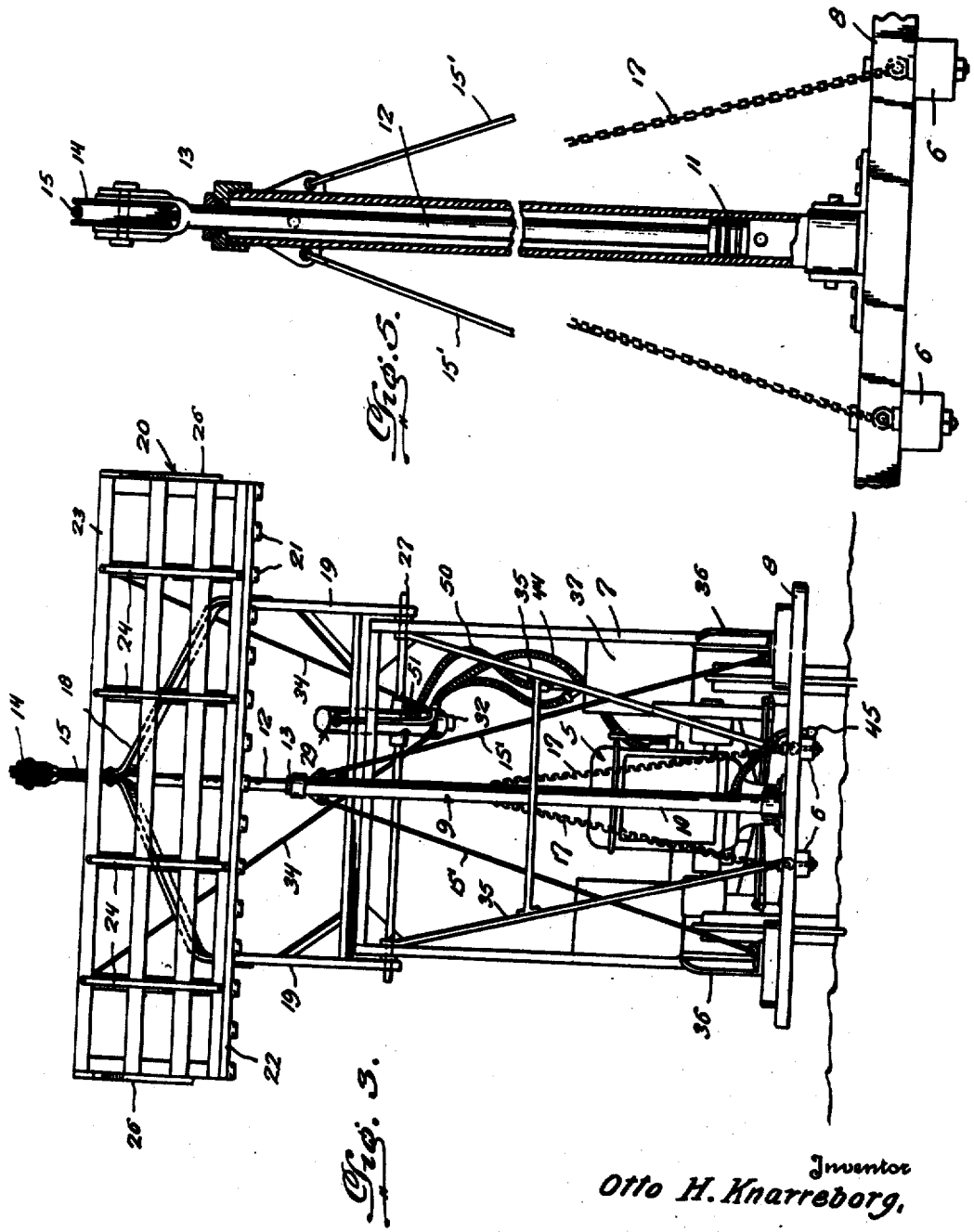

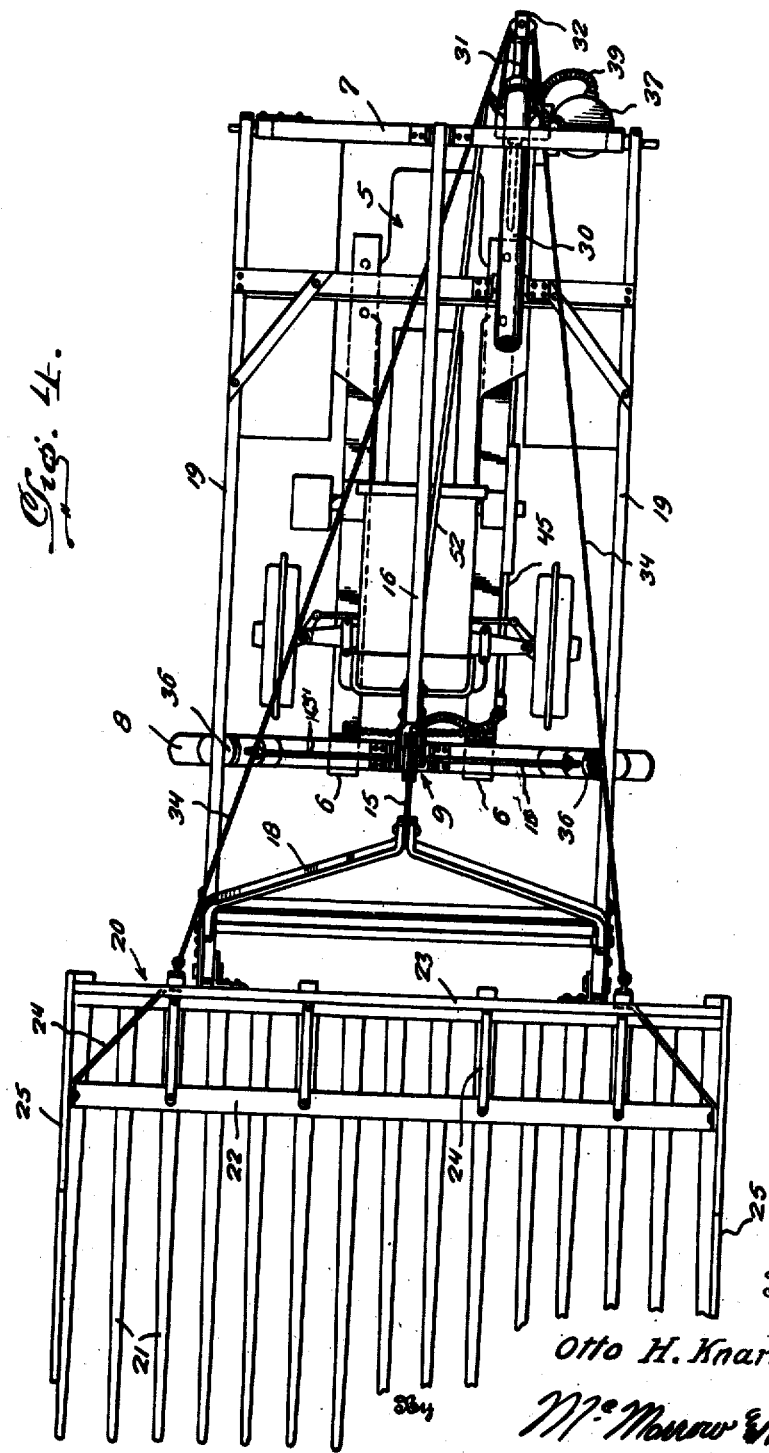

2,300,731

UNITED STATES PATENT OFFICE 2,300,731

COMBINATION RAKE AND STACKER

Otto H. Knarreborg, Devils Lake, N. Dak.

Application January 15, 1942, Serial No. 426,920

2 Claims. (Cl. 214—140).

This invention relates to a combination power rake and stacker, and has for the primary object the provision of a device of this character which is in the form of an attachment and may be easily and quickly installed on a conventionally constructed tractor to obtain power and transportation therefrom and is readily adaptable to permit the operator of said tractor to utilize the device in gathering materials and conveying the latter to a selected place for stacking or dumping into a pile or into a conveyance.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a side elevation illustrating a combined power rake and stacker constructed in accordance with my invention and showing the same installed on a tractor.

Figure 2 is a rear elevation illustrating the device and the tractor.

Figure 3 is a front elevation illustrating the device and the tractor.

Figure 4 is a top plan view illustrating the device and the tractor.

Figure 5 is a fragmentary sectional view illustrating the hydraulic hoist.

Figure 6 is a fragmentary diagrammatical view showing the hydraulic system.

Figure 7 is a detail sectional view, showing a three-way control valve.

Referring in detail to the drawings, the numeral 5 indicates a tractor of a conventional construction and to adapt the present invention thereto, horizontal and vertical frames 6 and 7 are provided. The horizontal frame is arranged under the tractor between the wheels thereof and is suitably secured on the tractor so as not to have relative movement with relation to the frame of the tractor.

The vertical frame 7 is mounted on the rear end of the tractor, as clearly shown in Figure 1. The forward end of the horizontal frame is located a limited distance beyond the front end of the tractor and includes a transversely arranged beam 8 on which is pivotally mounted a hydraulic hoist 9 including a cylinder 10 and a piston 11 slidable in said cylinder and provided with a stem 12 extending through a packing gland 13 at the upper end of the cylinder. The upper end of the stem 12 is forked and has journaled therein a pulley 14 over which a flexible element 15 is trained. The cylinder of the hoist is braced by rods or elements 15' connected thereto and to the horizontal frame. The rods or elements will permit the cylinder to have a limited pivotal movement on the horizontal frame.

To guide the upward and downward movement of the stem of the hoist 9, a brace 16 is pivoted to the forked end of the stem and to the upper end of the vertical frame 7. One end of the flexible element 15 is connected to flexible elements 17 which are in turn connected to the forward end of the horizontal frame. The other end of the flexible element 15 is connected to a yoke 18 pivoted on the forward end of a fork frame 19, the rear end of the latter being pivotally mounted on the upper end of the vertical frame 7. Pivoted to the forward end of the fork frame 19 is a gathering fork 20 including tines 21 tied together by a cross member 22 and also secured to a slotted end head frame 23. Braces 24 connect the head frame to the cross member 22. The fork may also include side arms 25 secured to the head frame 23 and further connected thereto by braces 26.

When the fork frame 19 is in its lowermost position, the gathering fork or the tines thereof may ride on the surface of the ground in advance of the tractor 5 for the purpose of raking or gathering hay, straw or other material and through the operation of the hoist the fork may be moved into an elevated carrying position, as clearly shown in Figure 1, all of which operations are under direct control of the operator of the tractor.

The pivot for the fork frame 19 on the vertical frame 7 is in the form of a shaft 27 journaled on the vertical frame adjacent its upper end and carried by said shaft 27 is a hydraulic ram 28 including a cylinder 29 and a piston 30 slidable therein and equipped with a stem 31 extending outwardly of one end of the cylinder and carrying a pulley head 32 in which are journaled pulleys 33. Flexible elements 34 are trained over the pulleys in opposite directions and each has one end connected to the stem and on opposite sides of the stem from each other. The other ends of the flexible elements 34 are connected to the head frame 23 of the fork 20.

Through the use of the hydraulic ram the operator may readily adjust the fork into different positions, as for instance, gathering position, load carrying position and a dumping position, When the fork is elevated and in load carrying position and after the tractor has arrived at a desired place, the fork can be tilted downwardly through the use of the ram so that the load can gravitate therefrom into a pile or stack or into a conveyance.

The purpose of pivotally mounting the cylinder of the ram is to permit the latter to readily follow the movement of the fork upwardly and downwardly.

The vertical frame 7 may be strengthened by braces 35 extending from the upper portion of the frame to the forward end of the tractor frame. To cushion the fork frame as the latter nears its lowermost position, spring fingers 36 are carried by the cross beam 8.

A liquid reservoir 37 is mounted on the tractor and has a pump 38 connected thereto by a pipe 39, the latter being connected to the intake of said pump and the latter is mounted on the tractor and its power shaft 40 is connected to a power takeoff 41 of the tractor which is of a conventional construction including a control clutch.

The outlet of the pump has a feed pipe 43 connected thereto and to which pipes 44 and 45 are connected. The pipe 45 is connected to the lower end of the cylinder of the hydraulic hoist 9, while the pipe 44 is connected to the cylinder of the ram adjacent the closed end of said latter-named cylinder. The pipes 44 and 45 are provided with control valves 46 and 47. The valve 47 is of the three-way type, the exhaust port thereof being connected to the reservoir 37 by a pipe 42.

A liquid return pipe 48 is connected to the cylinder of the ram and the reservoir 37, the purpose of which is to permit any fluid which passes the piston 30 of the ram to return to the reservoir. A bleed pipe 50 is connected to the pipe 44 adjacent the latter's connection to the cylinder of the ram 28 and to the reservoir 37 and is provided with a control valve 51. A return pipe 52 is also connected to the reservoir 37 and to the cylinder of the hydraulic hoist 9 adjacent the upper end of the latter-named cylinder, the purpose of which is to permit return of liquid from the ram when the piston thereof is in its uppermost position and also to bleed said cylinder of the hoist of liquid that may escape past the piston thereof and further to permit the force of the fluid in the hoist cylinder from forcing the piston outwardly thereof at the upper end if circulation of the liquid is kept up for a period of time by the operation of the pump 38, after the piston reaches its uppermost position.

To elevate the fork, the operator opens the valve 47 to permit the pump to free fluid from the reservoir into the lower end of the cylinder of the hoist 9 causing the piston thereof to move upwardly and by manipulating the valve 47, the operator can stop the travel of the piston at any position within the cylinder desired.

When it is desired to maintain the fork in any of its elevated positions, the valve 47 is closed. To lower the fork, the valve 47 is moved into exhausting position permitting the fluid to return to the reservoir by way of the pipe 42, the fork then lowers by gravitation.

To operate the fork into its different positions as heretofore specified, the operator can cause the piston 30 of said ram to assume different positions through the manipulation of the valves 51 and 46 with the pump 38 in operation. Also it will be noted that the adjusting of the fork into its several positions may take place either when the hoist 9 is idle or operating to raise or lower the fork. Portions of the pipes 44, 48 and 50 are of flexible construction to permit the ram to swing freely.

When the device is not in use on the tractor, the fork may be secured in an upwardly tilted direction so as not to engage the ground by engaging hooks 23' with eyes 25' which permits the tractor to be driven from place to place without the fork interfering by contacting the ground.

From the foregoing description, taken in connection with the accompanying drawings, it will be seen that a very efficient, durable and economically constructed combined fork and stacker has been provided which may be readily installed on a tractor of a conventional construction so that the tractor can be employed as the medium of transportation of said device as well as furnishing power for the operation of the hydraulic means to bring the fork into gathering position, load-carrying position, elevated position or unloading position.

Through the use of this device on the tractor, it is possible for large areas of cut growth to be easily and quickly gathered and carried to a desired place and stacked or piled or loaded into a conveyance.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a combined gatherer and stacker, a vertical frame mounted on the rear end of a tractor and including a horizontally disposed rotatable shaft located adjacent the upper end of the vertical frame, a horizontal platform arranged under and secured to the tractor and including a rigid cross member positioned forwardly of the front end of the tractor, a gatherer frame arranged over the tractor for upward and downward swinging movement and having the rear end thereof secured to said shaft with the forward end located forwardly of the front end of the tractor and adapted to be limited in its downward movement by the member of said platform, a gathering medium pivoted to the forward end of the gatherer frame, a hydraulic hoist pivoted to the member of said frame and connected to the gatherer frame for the upward swinging thereof, a hydraulic ram secured to the shaft and movable therewith and connected to the gathering medium for the pivotal adjustment thereof, and a manually controlled power driven hydraulic operating means connected to the hoist and to the ram.

2. In a combined gatherer and stacker, a vertical frame mounted on the rear end of a tractor and including a horizontally disposed rotatable shaft located adjacent the upper end of the vertical frame, a horizontal platform arranged under and secured to the tractor and including a rigid cross member positioned forwardly of the front end of the tractor, a gatherer frame arranged over the tractor for upward and downward swinging movement and having the rear end thereof secured to said shaft with the forward end located forwardly of the front end of the tractor and adapted to be limited in its downward movement by the member of said platform, a gathering medium pivoted to the forward end of the gatherer frame, a hydraulic hoist pivoted to the member of said frame and connected to the gatherer frame for the upward swinging thereof, a hydraulic ram secured to the shaft and movable therewith and connected to the gathering medium for the pivotal adjustment thereof, a manually controlled power driven hydraulic operating means connected to the hoist and to the ram, and spring fingers secured to the member of said platform for cushioning the gathering frame on nearing its lowermost position.

OTTO H. KNARREBORG.